United States Patent Office 3,015,665
Patented Jan. 2, 1962

3,015,665
SYNTHESIS OF DIOXANE COMPOUNDS
Johannes Wollner, Moers, Germany, assignor to Rheinpreussen Aktiengesellschaft für Bergbau und Chemie, Homberg, Lower Rhine, Germany, a corporation
No Drawing. Filed Aug. 4, 1958, Ser. No. 753,120
Claims priority, application Germany Aug. 7, 1957
8 Claims. (Cl. 260—340.7)

This invention relates to the synthesis of organic compounds.

The invention provides as novel compounds 5($\alpha,\beta$-dihydroxyethyl) - 5-methyl-1,3-dioxane, 5-hydroxyacetyl-5-methyl-1,3 dioxane and 5-chloroacetyl-5-methyl-1,3-dioxane.

These compounds, according to the invention, can be derived from 5-acetyl-5-methyl-1,3-dioxane, which can be made in a known manner from methylethyl ketone and formaldehyde. The reactions involved in making compounds of the invention are as follows:

REACTION I

A halogen, especially chlorine, is reacted with the acetyl-1,3-dioxane to form the halogeno-acetyl-1,3-dioxane:

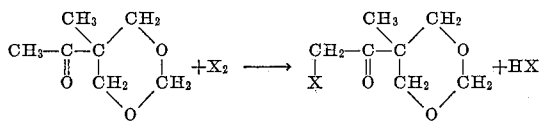

REACTION II

The halogenacetyl-1,3-dioxane is reacted with an alkali to form 5-hydroxyacetyl-5-methyl-1,3-dioxane:

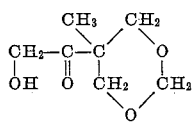

REACTION III

The hydroxyacetyl-1,3-dioxane is then reduced to form the dihydroxyethyl-1,3-dioxane:

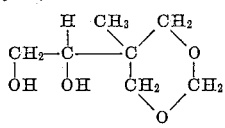

With respect to the halogenization reaction, i.e. Reaction I, it was surprising that the halogenization could be carried out without the splitting of the 1,3-dioxane ring in consequence of the presence of hydrohalogenic acid in the reaction medium. As halogens chlorine, bromine and iodine can be employed; for economic reasons the use of chlorine is preferred. The halogenation is performed in this manner that chlorine gas is bubbled through the liquid 5-acetyl-5-methyl-1,3-dioxane, respectively bromine or iodine is added in small portions to the liquid starting material. As reaction temperatures such up to 35° C., preferably 5–25° C. come into question. To avoid the formation of higher halogenated products less than the molar amount of halogen is employed, preferably 60–80% of the amount theoretically necessary.

The hydroxylation reaction, Reaction II, is carried out with alkalis at temperatures not higher than about 50° C., preferably at temperatures of about 10 to about 20° C. As alkalis can be used alkali metal hydroxides and alkaline earth metal hydroxides. These hydroxides are used as 0.5 to 5 N, preferably 1 to 2 N aqueous solutions or suspensions. They are introduced slowly while cooling in order to avoid the temperature of the reaction mixture ascending over the desired reaction temperature. The reaction mixture is neutralized with an acid especially an inorganic acid, and, following concentration in vacuum, the hydroxyacetyl 1,3-dioxane can be recovered by extraction with a solvent and, in given cases, by recrystallization from a suitable solvent, such as ethylacetate.

The hydroxylation reaction was surprising in that it was not to be foreseen that the saponification of the 5-halogeno-acetyl-5-methyl-1,3-dioxane by dilute alkalis would proceed with the ease observed without side reactions such as the auto-condensation of 5-hydroxyacetyl-5-methyl-1,3-dioxane taking place in the presence of the intact carbonyl group.

The reduction of the keto group in Reaction III can take place in accordance with known methods, for instance by pressure-hydrogenation with hydrogen and a hydrogenation catalyst such as nickel or copper oxide/chromium oxide.

The invention is described further by the following example wherein an embodiment of the invention is set forth.

EXAMPLE I 1800 grams of 5-acetyl-5-methyl-1,3-dioxane are chlorinated in such a manner, e.g. by bubbling chlorine gas through the liquid acetyl-1,3-dioxane, that there is an increase of weight of 640 grams within 7 hours at 15 to 23° C. Thereupon the dissolved reaction gases are expelled by heating the reaction product at 60° C. in a vacuum and the reaction mixture is neutralized by stirring with 20% caustic soda solution. Fractionation under vacuum in a small packed column gives 1505 grams of 5-chloroacetyl-5-methyl-1,3-dioxane ($BP_{12}$: 131 to 133° C.) and a first-running consisting of 317 grams ($BP_{12}$: 92–131° C.) of predominantly unchanged 5-acetyl-5-methyl-1,3-dioxane, which is employed for the next chlorination.

2320 milliliters 2 N-aqueous sodium hydroxide solution are introduced, drop by drop, with intense stirring and cooling at 15 to 20° C. into 800 grams of 5-chloroacetyl-5-methyl-1,3-dioxane (4.5 mols). After 9 hours the sodium hydroxide solution added is practically entirely consumed. Thereupon it is neutralized with 2 N-hydrochloric acid and concentrated in vacuum. The residue consists of sodium chloride and crude 5-hydroxyacetyl-5-methyl-1,3-dioxane, which is dissolved in 700 milliliters of hot ethylacetate. Upon cooling the solution, the 5-hydroxyacetyl-5-methyl-1,3-dioxane crystallizes out in the form of slightly yellow crystals. Yield 411.5 grams (57.1% of the theoretical yield). By concentration of the mother liquor, there are obtained an additional 168.7 grams (23.4%) of 5-hydroxyacetyl-5-methyl-1,3-dioxane, so that the total yield is 80.5% of the theoretical yield. Melting point of the pure compound: 79° C. (after recrystallization 4 times from ethyl acetate).

200 grams of 5-hydroxyacetyl-5-methyl-1,3-dioxane dissolved in 1 liter of isopropanol are hydrogenated in the presence of 70 grams of copper oxide/chromium oxide catalyst in a two liter Remanit autoclave provided with electromagnetic push-pull agitation. After agitation for 4 hours at 175° C. and a hydrogen pressure of 150 atmospheres gauge, the hydrogen absorption is complete. From the alcoholic solution freed from the catalyst, the 5($\alpha,\beta$-dihydroxyethyl)5-methyl-1,3-dioxane is recovered by vacuum distillation. Yield: 190 grams ($BP_{11}$:164–165° C.).

The 5($\alpha,\beta$-dihydroxyethyl)-5-methyl-1,3-dioxane prepared in accordance with the invention is a valuable glycol which is of particular advantage in the preparation of unsaturated polyesters.

Further it is valuable for the production of unsaturated ethers, for example of the diallyl ether, which are added to saturated or unsaturated polyester resins (produced in a generally known manner out of polyhydric alcohols, like glycols, and saturated or unsaturated dicarbonic acids, like phthalic acid, terephthalic acid, maleic acid, fumaric acid, succinic acid or sebacic acid) to obtain air-drying varnish resins.

It is further possible to produce first of all unsaturated ethers out of the 5($\alpha,\beta$-dihydroxy-ethyl)-5-methyl-1,3-dioxane, for example the diallyl ether, then to split off the dioxane ring with acids in the presence of aliphatic diols under separation of formaldehyde, and to use the ether glycols thereby produced, for example the 3,4-diallylhydroxy-2-methyl-2-hydroxymethylbutanol-(1), alone or together with other conventionally employed polyhydric alcohols, as alcohol components in the production of polyester resins.

The ring splitting mentioned above is preferably performed according to the process of the U.S.-application, Serial Number 753,158, filed August 4, 1958, now abandoned, corresponding to the German patent application R21648IVb/120, filed August 7, 1957.

EXAMPLE II

*Preparation of an unsaturated polyester resin using 5($\alpha,\beta$-dihydroxyethyl)-5-methyl-1,3-dioxane as alcoholic compound*

0.8 mol of fumaric acid, 1.2 mols of phthalic acid anhydride, 1.1 mols of 1,3-butane diol and 1.1 mols of 5($\alpha,\beta$-dihydroxy ethyl)-5-methyl-1,3-dioxane are heated to 180–200° C. for 10 hours by passing through of carbon dioxide whereby 52 cc. of reaction water were separated. Thereafter, the reaction mixture has an acid number of 45.

100 parts by weight of this ester are mixed with 50 parts by weight of styrene and after the addition of 3 parts by weight of a 50 wt. percent methyl ethyl ketone peroxide solution in dimethyl phthalate and 0.6 parts by weight of a solution of cobalt octoate in styrene of 1 wt. percent cobalt content, the mixture is hardened at room temperature. There is obtained a hard glass-clear and non-sticky surface resin of a high light-refractive power. A resin, for the production of which there is used no 5($\alpha,\beta$-dihydroxy ethyl)-5-methyl-1,3-dioxane but exclusively 1,3-butane diol, with otherwise the same starting materials shown, on the contrary, a sticky surface.

EXAMPLE III

*Preparation of unsaturated ether from 5($\alpha,\beta$-dihydroxyethyl)-5-methyl-1,3-dioxane*

1 mol of 5($\alpha,\beta$-dihydroxy ethyl)-5-methyl-1,3-dioxane together with 2 mols of allyl chloride, and 2 mols of solid sodium hydroxide, solved in the same amount by weight of water, are heated to boiling under reflux for 20 hours. Afterwards the reaction mixture cooled down is neutralized with 2 N-hydrochloric acid. The aqueous layer is removed and the organic layer separated by filtration from the precipitated sodium chloride. The unreacted allyl chloride is evaporated out of the filtrate, whereupon the residue is distilled in the vacuum. The diallyl ether of the dioxane employed distills over at a pressure of 12 mm. Hg at 144–145° C. (yield 87% of the theory).

EXAMPLE IV

*Preparation of an air-drying lacquer resin*

An unsaturated polyester is produced by heating of 1.2 mols of maleic acid anhydride, 0.8 mol of phthalic acid anhydride and 2.2 mols of 1,2 propylene glycol at 200 to 220° C. The condensation reaction is continued till the reaction product shows an acid number of 38 to 40.

2 parts by weight of this unsaturated polyester are mixed with 1 part by weight of styrene and 1 part by weight of 5($\alpha,\beta$-diallyloxy-ethyl)-5-methyl-1,3-dioxane. Then 0.8 wt. percent of a 50 wt. percent methyl ethyl ketone peroxide solution in dimethyl phthalate and 4 wt. percent of a solution of cobalt octoate in styrene with 1 wt. percent cobalt content are added. This composition is coated in a thickness of 0.1 mm. on glass plates. After a hardening of 24 hours at room temperature, the films showed a smooth, non-sticky surface.

I claim:

1. The method of claim 7 wherein the alkali is sodium hydroxide.

2. The compound 5($\alpha,\beta$-dihydroxyethyl)-5-methyl-1,3-dioxane.

3. The compound 5-hydroxyacetyl-5-methyl-1,3-dioxane.

4. The compound 5-chloroacetyl-5-methyl-1,3-dioxane.

5. A method of preparing 5($\alpha,\beta$-dihydroxyethyl)-5-methyl-1,3-dioxane, which comprises reacting 5-acetyl-5-methyl-1,3-dioxane with less than a molar amount of a halogen which is a member selected from the group consisting of chlorine, bromine and iodine, at a temperature of up to 35° C., reacting the 5-halogeno-acetyl-5-methyl-1,3-dioxane thereby formed with an alkali which is a member selected from the group consisting of alkali metal hydroxides and alkaline earth metal hydroxides having a concentration of from 0.5–5 N, at a temperature of up to 50° C. and reducing the 5-hydroxy-acetyl-5-methyl-1,3-dioxane thereby formed by pressure hydrogenation with hydrogen in the presence of a member selected from the group consisting of nickel oxide-chromium oxide and copper oxide-chromium oxide as hydrogenation catalyst and recovering said 5($\alpha,\beta$-dihydroxyethyl)-5-methyl-1,3-dioxane formed.

6. The method of claim 5, wherein said alkali has a concentration of from 1–2 N.

7. A method of preparing 5-hydroxy-acetyl-5-methyl-1,3-dioxane, which comprises reacting 5-acetyl-5-methyl-1,3-dioxane with less than a molar amount of a halogen which is a member selected from the group consisting of chlorine, bromine and iodine, at a temperature of up to 35° C., reacting the 5-halogeno-acetyl-5-methyl-1,3-dioxane thereby formed with an alkali which is a member selected from the group consisting of alkali metal hydroxides and alkaline earth metal hydroxides having a concentration of from 0.5–5 N, at a temperature of up to 50° C., and recovering the 5-hydroxy-acetyl-5-methyl-1,3-dioxane formed.

8. A method of preparing 5-chloroacetyl-5-methyl-1,3-dioxane, which comprises reacting 5-acetyl-5-methyl-1,3-dioxane with less than a molar amount of a halogen which is a member selected from the group consisting of chlorine, bromine and iodine, at a temperature of up to 35° C., and recovering the 5-chloroacetyl-5-methyl-1,3-dioxane formed.

References Cited in the file of this patent

UNITED STATES PATENTS

| | | |
|---|---|---|
| 1,849,844 | Lloyd et al. | Mar. 15, 1932 |
| 2,181,297 | Britton et al. | Nov. 28, 1939 |
| 2,355,410 | Bergel | Aug. 8, 1944 |
| 2,394,848 | Doumani | Feb. 12, 1946 |
| 2,598,040 | Dermer et al. | May 27, 1952 |

FOREIGN PATENTS

| | | |
|---|---|---|
| 1,030,837 | Germany | May 29, 1958 |